US009832456B2

United States Patent
Wan

(10) Patent No.: US 9,832,456 B2
(45) Date of Patent: Nov. 28, 2017

(54) MULTISCALE DEPTH ESTIMATION USING DEPTH FROM DEFOCUS

(71) Applicant: CANON KABUSHIKI KAISHA, Tokyo (JP)

(72) Inventor: Ernest Yiu Cheong Wan, Carlingford (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/972,477

(22) Filed: Dec. 17, 2015

(65) Prior Publication Data
US 2016/0182893 A1    Jun. 23, 2016

(30) Foreign Application Priority Data
Dec. 22, 2014    (AU) .................................. 2014280872

(51) Int. Cl.
| G06K 9/00 | (2006.01) |
| H04N 13/02 | (2006.01) |
| G06T 5/30 | (2006.01) |
| G06T 7/593 | (2017.01) |

(52) U.S. Cl.
CPC ......... H04N 13/0271 (2013.01); G06T 5/30 (2013.01); G06T 7/593 (2017.01); H04N 13/0207 (2013.01); H04N 13/0246 (2013.01); H04N 13/0282 (2013.01); *G06T 2207/10021* (2013.01); *G06T 2207/10028* (2013.01); *G06T 2207/20028* (2013.01); *G06T 2207/20192* (2013.01)

(58) Field of Classification Search
USPC ........................................................ 382/154
See application file for complete search history.

(56) References Cited

U.S. PATENT DOCUMENTS

| 6,741,755 B1 * | 5/2004 | Blake ........................ G06T 5/30 |
| | | 382/257 |
| 2011/0286633 A1 * | 11/2011 | Wang ................. G06K 9/00771 |
| | | 382/103 |
| 2013/0266210 A1 | 10/2013 | Morgan-Mar et al. |
| 2016/0012567 A1 * | 1/2016 | Siddiqui ............... G06T 3/4007 |
| | | 382/154 |

OTHER PUBLICATIONS

Schechner, Y.Y.; Kiryati, N.. Depth from Defocus vs. Stereo: How Different Really Are They? Int. J. Comput. Vision, 2000, vol. 39(2), pp. 141-162, Kluwer Academic Publishers, The Netherlands.
(Continued)

*Primary Examiner* — Alex Liew
(74) *Attorney, Agent, or Firm* — Canon U.S.A., Inc. IP Division

(57) ABSTRACT

To extend the working range of depth from defocus (DFD) particularly on small depth of field (DoF) images, DFD is performed on an image pair at multiple spatial resolutions and the depth estimates are then combined. Specific implementations construct a Gaussian pyramid for each image of an image pair, perform DFD on the corresponding pair of images at each level of the two image pyramids, convert DFD depth scores to physical depth values using calibration curves generated for each level, and combine the depth values from all levels in a coarse-to-fine manner to obtain a final depth map that covers the entire depth range of the scene.

23 Claims, 15 Drawing Sheets

(56) References Cited

OTHER PUBLICATIONS

Watanabe, M., Nayar, S.K. Minimal operator set for passive depth from defocus. In Proceedings of the 1996 IEEE Computer Society Conference on Computer Vision and Pattern Recognition, Proceedings from CVPR 1996, San Francisco, USA, Jun. 1996; IEEE Computer Society: San Francisco, USA, Jun. 1996; p. 431-438.
Stokseth, P.A.; Properties of a Defocused Optical System, Journal of the Optical Society of America, vol. 59, No. 10, Oct. 1969.

* cited by examiner

MULTISCALE DEPTH ESTIMATION USING DEPTH FROM DEFOCUS

REFERENCE TO RELATED PATENT APPLICATION(S)

This application claims the benefit under 35 U.S.C. §119 of the filing date of Australian Patent Application No. 2014280872, filed Dec. 22, 2014, hereby incorporated by reference in its entirety as if fully set forth herein.

TECHNICAL FIELD

The current invention relates to depth estimation using depth from defocus (DFD) methods and, in particular, to the estimation of depth from images with a small depth of field (DoF) using DFD.

BACKGROUND

In many applications of image capture, it can be advantageous to determine the distance from the image capture device to objects within the field of view of the image capture device. A collection of such distances to objects in an imaged scene may be referred to as a depth map. A depth map of an imaged scene may be represented as an image. In the depth map, the distance to objects corresponding to each pixel of the depth map is represented by a greyscale or colour value.

A depth map can be useful in the fields of photography and video, as a depth map enables several desirable post-capture image processing capabilities. For example, a depth map can be used to segment foreground and background objects to allow manual post-processing, or the automated application of creative visual effects. A depth map can also be used to apply depth-related visual effects, such as changing the background scene of an image or a video.

Depth estimation may be performed by depth from defocus (DFD) using a single camera by capturing two or more images with different focus or aperture settings and analysing relative blur between corresponding tiles of the images. Depth from defocus is a flexible method because the depth from defocus method uses a single standard camera without special hardware modifications. The same camera can be used for image or video capture and also for depth capture.

Existing depth from defocus methods typically impose restrictions on the camera settings. The restrictions ensure that the captured images will have a large depth of field (DoF) so that different degrees of relative blur are produced over the entire depth range covered by a scene. For instance, in FIG. 3, an image pair 310, 320, each with a large DoF, is used to produce a DFD depth map 330 of relative depth in which higher intensity represents smaller depth. While the depth map 330 exhibits small patches of depth errors, such as errors 340 and 350, the entire range of the depth of the scene is covered in the depth map 330, where the lighter greyscale indicates foreground and the darker greyscale indicates background.

However, for many common photographic applications, a small depth of field is desirable, for example to perceptually separate the subject from the background in a portrait photo. If the images have a small depth of field, existing depth from defocus methods will only be able to estimate depths that are close to the plane of best focus. Objects that are further away from the plane of best focus will be assigned incorrect depth. For instance, in FIG. 4, an image pair 410, 420, both images having a small DoF, is used to produce a DFD depth map 430 in which higher intensity represents smaller or shallower depth. The scene in this example has a mannequin 440 in the foreground around 2 m from the camera and a teddy bear 450 slightly behind the mannequin at about 2.5 m against a grassy backdrop 460 at about 3.8 m. The best focus is around 2.1 m from the camera. The depth map 430 shows that, while the mostly in-focus mannequin is assigned consistent depth values, the teddy bear and the grassy backdrop are assigned inconsistent and conflicting depth values. The grassy backdrop, in particular, is often assigned depth values which suggest that it is closer to the camera than the teddy bear. To cover the entire depth, a number or set of images (more than 2) with small DoF can be taken with different focus distance to cover different depth ranges. The DFD depth estimates from each pair of images in the set may then be combined to obtain a full depth map. However, this requires a longer capture time, and any camera or object motion, as well as changes in lighting conditions during capture, will lead to higher depth estimation errors.

DFD methods typically divide the input images into tiles for depth map processing. The size of the tiles used in the depth from defocus method also affects the accuracy of the depth estimates. The larger the size of the tiles, the less noisy the depth estimates over regions of similar depth. However, the spatial resolution at depth boundaries is reduced. Along depth boundaries, the depth from defocus method assumption of constant depth (over a tile) is often violated and the depth estimates are inaccurate. Depth from defocus methods also generate very noisy or no depth estimates in regions with little texture. As a result, DFD depth maps often need to be refined to reduce noise in depth estimates and align depth boundaries with object edges. Even after such refinement, the depths can remain inaccurate due to poor initial depth estimates.

SUMMARY

It is an object of the present invention to substantially overcome, or at least ameliorate, one or more disadvantages of existing arrangements.

According to one aspect of the present disclosure there is provided a method of generating a merged physical depth map from a pair of images of a scene captured by an image capture device using different capture parameters, said method comprising:

generating, from the captured pair of images, at least one pair of downsampled images at a corresponding spatial resolution; and for each pair of images:
  forming a relative depth map from the pair of images;
  accessing calibration data of the image capture device associated with the pair of images, the calibration data relating relative depth measurements with physical depth and having a defined working range where a single relative depth measurement relates to a single physical depth; and
  determining a physical depth map for the pair of the images from the formed relative depth map and the accessed calibration data; and generating a merged physical depth map by merging, in order of increasing spatial resolution, depth values within the defined working range associated with each of the determined physical depth maps.

Preferably, generating the merged physical depth map uses confidence measures associated with the relative depth estimates to weight the physical depth values from corresponding spatial resolutions when merging the physical depth values.

Desirably the generating the merged physical depth map refines the physical depth map at each spatial resolution by:

upsampling a depth map of the previous coarser resolution and using the upsampled depth map as an initial refined depth map;

forming a current refined depth map by minimising an energy function that penalises depth values that, at least one of:

(i) deviate from the physical depth measurements of the current spatial resolution ; and (ii) produce large local depth gradients.

In one implementation, for (i), the energy function operates such that a data penalty increases with the associated confidence measure of the depth measurements.

In another implementation the penalty of (ii) is reduced at pixels where a large local depth gradient is matched by a large local intensity gradient in the associated image The method may further comprise modifying depth boundaries of the refined depth map by:

(i) locating pixels that are potentially lying on a depth boundary;

(ii) dilating regions of said located pixels; and (iii) performing edge-preserved, preferably joint bilateral, filtering on said dilated regions of said located pixels to modify the corresponding physical depth values and thereby the corresponding depth boundary.

Desirably step (i) comprises locating pixels with an associated image and whose depth gradient exceeds a pre-defined threshold to thereby define a depth boundary.

Alternatively step (i) comprises identifying pixels whose depth gradient exceeds a pre-defined threshold and lie on an edge on the associated image.

Other aspects of the invention are also disclosed.

BRIEF DESCRIPTION OF THE DRAWINGS

At least one embodiment of the invention will now be described with reference to the following drawings, in which.

DETAILED DESCRIPTION INCLUDING BEST MODE

The present disclosure is directed to providing methods of estimating depth from a pair of images that have a small depth of field. The methods seek to offer one or more of extending the depth range, improving accuracy, improving spatial resolution and improving object/depth boundary alignment of the depth map.

Context

The arrangements presently disclosed may be implemented on a variety of hardware platforms, including in an imaging device such as a camera, or on a general purpose computer (PC), or in a cloud computing implementation.

Figure 1A:
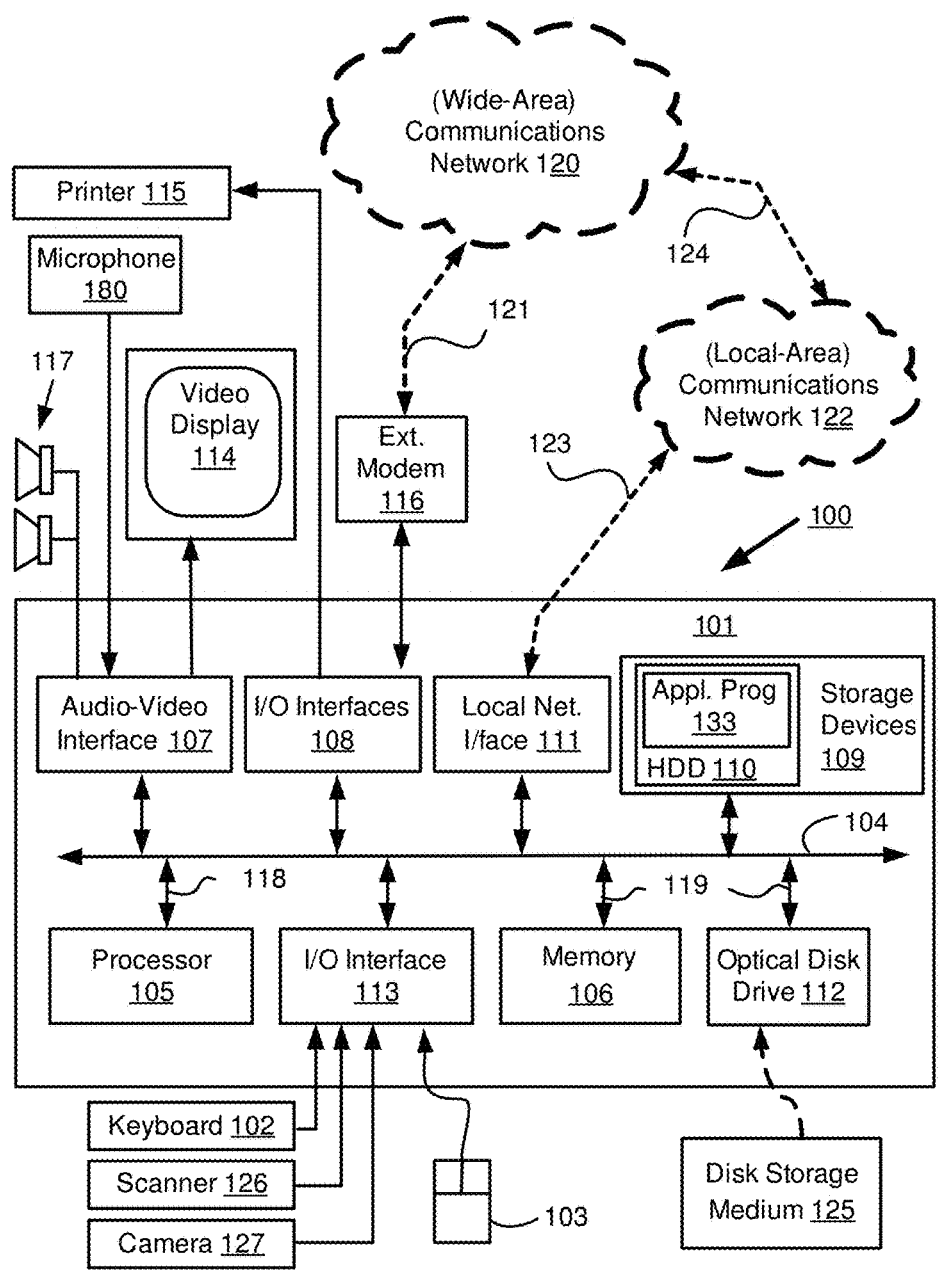
FIGS. 1A and 1B form a schematic block diagram of a general purpose computer upon which arrangements described can be practised.
Figure 1B:
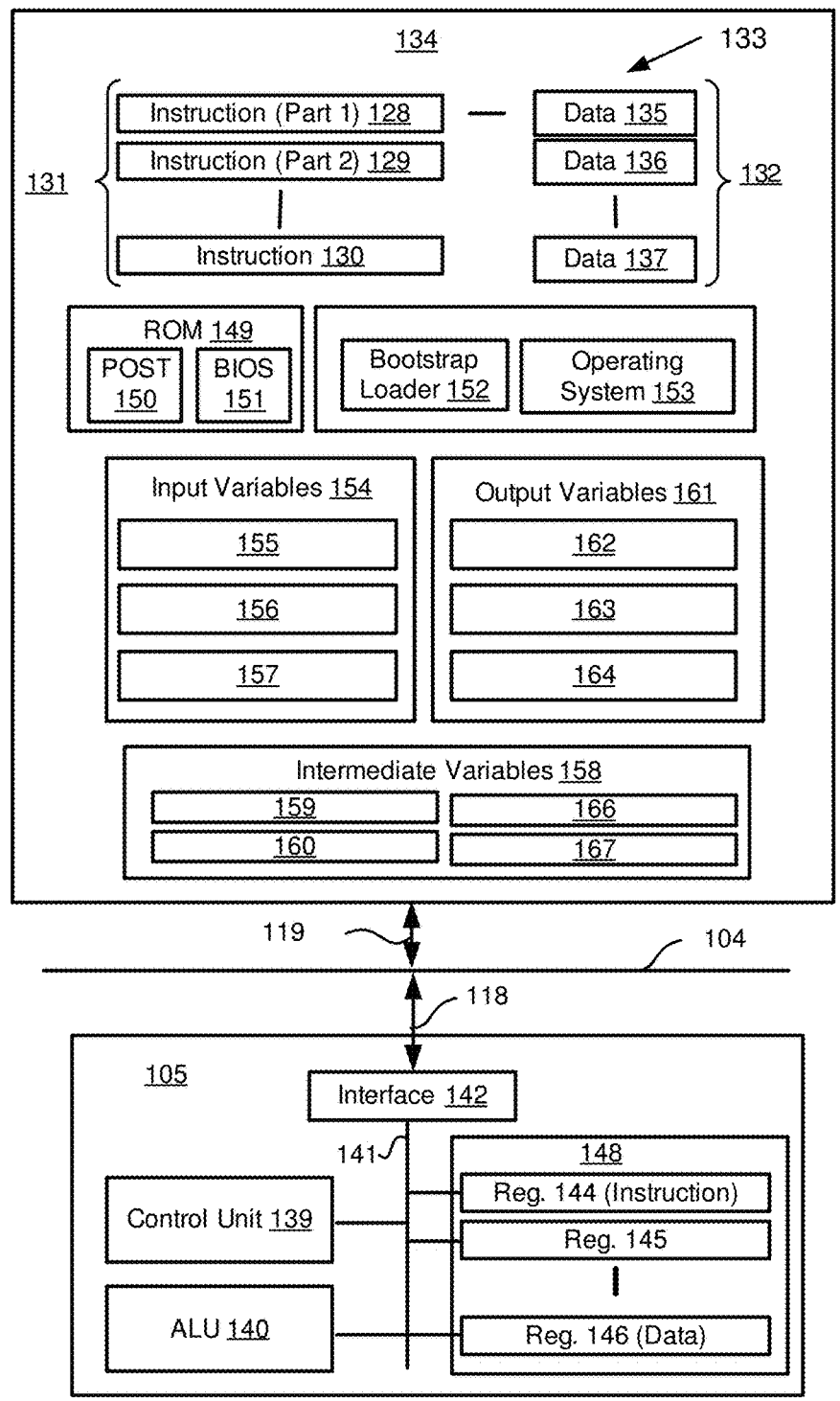

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. The camera 127 may be a still camera or a video camera. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEDD 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The described methods may be implemented using the computer system 100 wherein the processes of FIGS. 1 to 9, to be described, may be implemented as one or more software application programs 133 executable within the computer system 100. In particular, the steps of the described methods are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user. In a cloud computing implementation, the application programs 133 may be executed on a server computer (not illustrated, but generally akin to the computer module 101) residing on either of the networks 120, 122 and interacting with the computer 101 for the supply of images received from the camera 127.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144 - 146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The described methods use input variables 154, which are stored in the memory 134 in corresponding memory locations 155, 156, 157. The described methods produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(i) a fetch operation, which fetches or reads an instruction 131 from a memory location 128, 129, 130;

(ii) a decode operation in which the control unit 139 determines which instruction has been fetched; and (iii) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 9 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

In one arrangement, the camera 127 may capture multiple images of a scene. The camera 127 may implement depth estimation and refinement algorithmic processes in order to produce and refine depth from defocus (DFD) depth maps of the captured images to provide a refined depth map for various purposes. The refined depth map may be used for producing various visual effects such as changing the background of the images The refined depth map may alternatively be used for attaching depth information as image metadata to enable other post-processing operations. The refined depth map generated by the camera 127 may be retained in a memory of the camera 127 or the refined depth map may be written to a memory card or other memory storage device connectable to the camera 127. Alternatively, the refined depth map generated by the camera 127 may be uploaded to a cloud computing server connected to the network 120, for later retrieval by a user.

In another arrangement, the camera 127 may capture multiple images of a scene which are subsequently transferred to the computer module 101. The computer module 101 or the like may implement a depth estimation and refinement method as one or more software modules of the software application program 133 to produce and refine depth from defocus (DFD) depth maps, which a user can use for image segmentation or further image processing operations. The images may be retained in the memory 106 or written to a memory card or other memory storage device. At a later time, the images may be transferred to the computer module (e.g. 101), where the depth from defocus (DFD) process uses the images as input to produce a depth map required for the depth refinement process.

In yet another arrangement, a cloud computing server or the like connected to the network 120 may implement both the depth from defocus (DFD) and the depth refinement processing in software to enable post-capture processing of images to generate depth estimates. In such a cloud computer server arrangement, the camera 127 captures multiple images of a scene. The images captured by the camera 127 are then uploaded to the cloud computing server, where subsequent steps of the depth from defocus (DFD) use the images as input to generate depth maps. The cloud computing server then refines the depth maps and may then download the refined depth maps back to the camera 127, or store the refined depth maps for later retrieval by the user.

Overview

Most scenes that are captured using an imaging device, such as the camera 127, contain multiple objects, which are located at various distances from the lens of the device. Commonly, the imaging device is focused on an object of interest in the scene. The object of interest shall be referred to as the subject of the scene.

Figure 2:
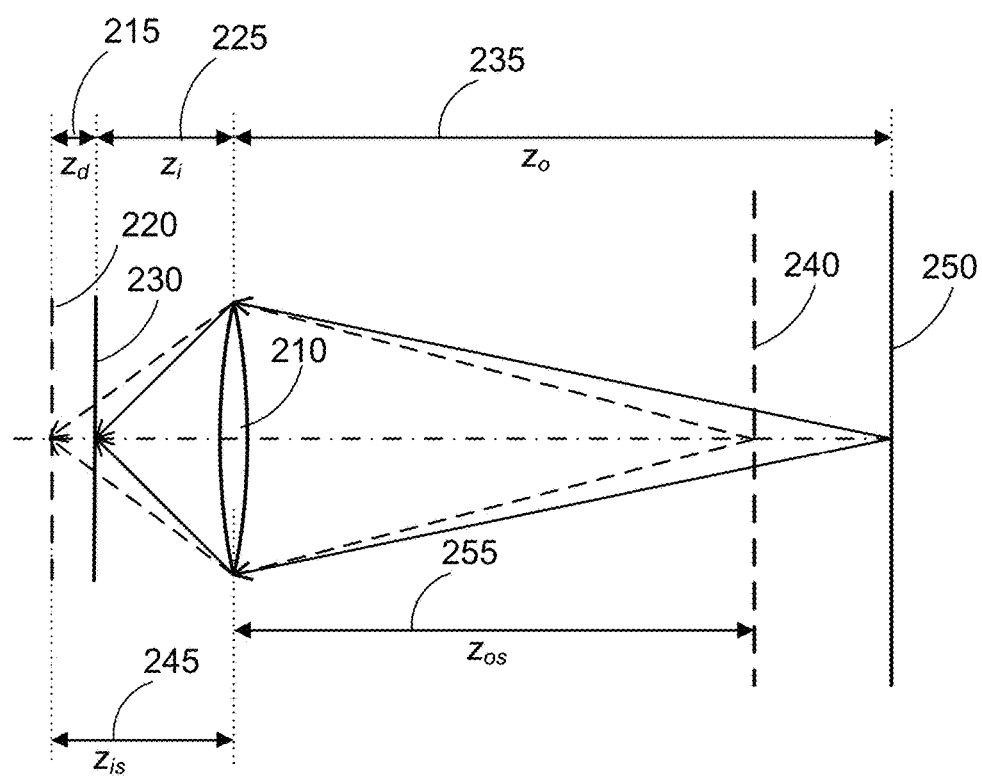
FIG. 2 is a schematic representation of the optical parameters associated with depth from defocus determinations.
Figure 3:
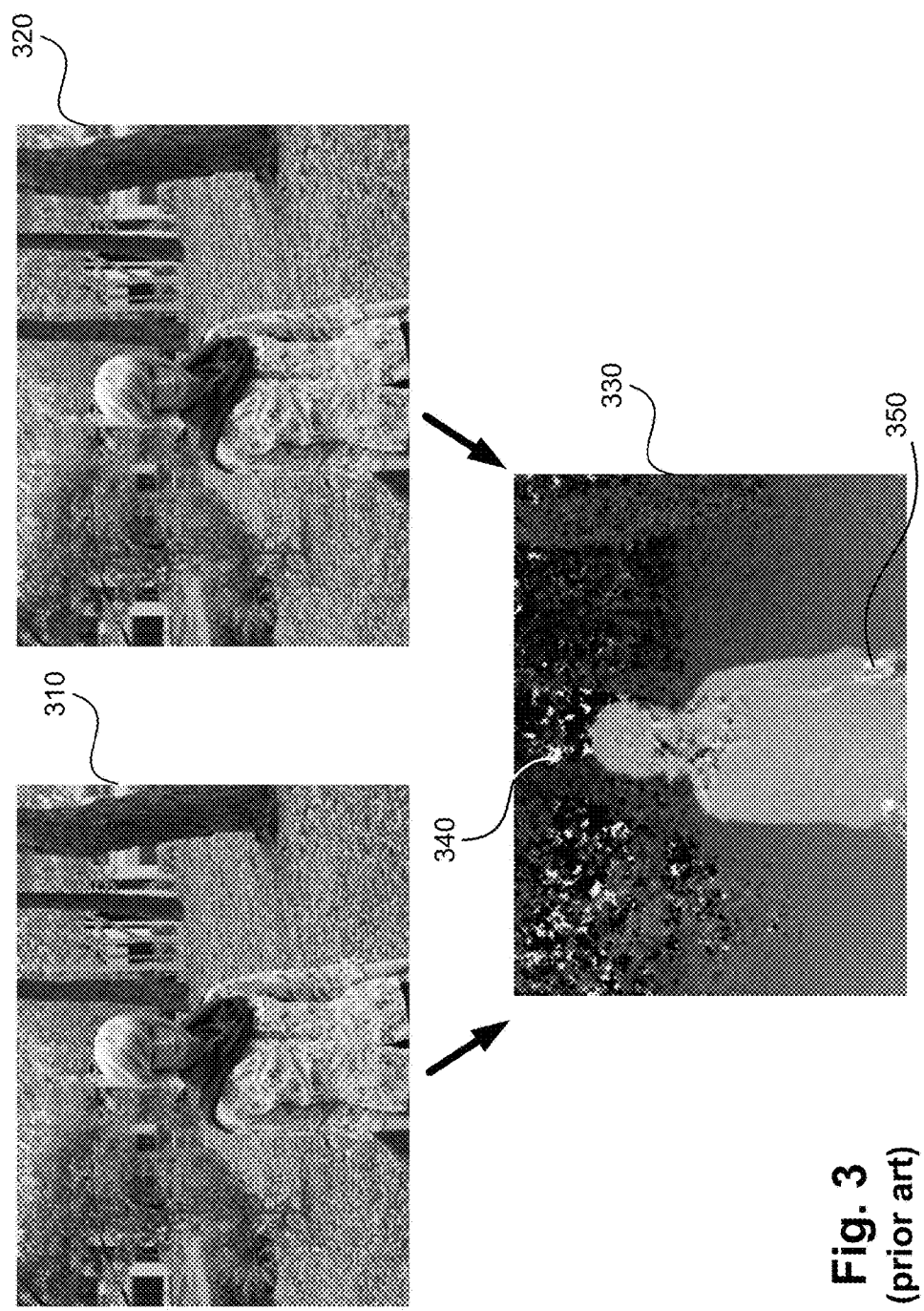
FIG. 3 is an example of an image pair with a large depth-of-field (DoF) and an associated prior art DFD depth map.

FIG. 2 is a schematic diagram showing the geometrical relationships between a lens 210 of an imaging device (e.g. camera 127) and objects in a scene to be captured. An image sensor 230 of the imaging device is positioned at an image distance $z_i$ 225 behind the lens 210, which corresponds to an object distance $z_o$ 235 to an object plane 250 in the scene. Any parts of the scene in the object plane 250 will be at best focus in the image captured by the image sensor 230. A subject 240 at a different distance, the subject distance $z_{os}$ 255 is at best focus at the image subject plane 220 which is at an image subject distance $z_{is}$ 245 behind the lens 210. The subject 240 will be blurred on the image sensor 230 by a blur radius σ that increases with an image defocus distance $z_d$ 215, being the distance between the image sensor 230 and the image subject plane 220. The distances between the image planes and the corresponding object planes in the scene, including the object distance $z_o$ 235 and the image distance $z_i$ 225, are approximately determined by the thin lens law according to the equation $$\frac{1}{z_i} + \frac{1}{z_o} = \frac{1}{f} \quad (1)$$

where f is the focal length of the lens 210.

The principle of estimating the blur difference from a pair of images in depth from defocus (DFD) can be explained using a convolution model of noise-free image formation. A first image $i_1(x, y)$ of a scene $f(x, y)$ with spatial co-ordinates (x, y) can be modelled using $$i_1(x, y) = h(x, y; z_d, p_1) \otimes s(x, y) \quad (2)$$

where ⊗ denotes convolution and $h(x, y; z_d, p_1)$ is the defocus point spread function (PSF) for an object with image defocus distance $z_d$ captured with camera (imaging device) parameter $p_1$. The camera parameter may be any setting which changes the sensitivity of the PSF with respect to changes in image defocus distance. Example camera parameter settings with this property include the lens focal length f, the lens focus distance $z_i$, and the lens aperture diameter $A_v$.

A second image $i_2(x, y)$ of the same scene $s(x, y)$ can be modelled using $$i_2(x, y) = h(x, y; z_d, p_2) \otimes s(x, y) \quad (3)$$

where ⊗ denotes convolution and $h(x, y; z_d, p_2)$ is the defocus PSF for an object captured with camera parameter $p_2$.

Equations (2) and (3) can be expressed in the spatial frequency (Fourier) domain as $$I_1(u, v) = H(u, v; z_d, p_1) S(u, v) \quad (4)$$
$$I_2(u, v) = H(u, v; z_d, p_2) S(u, v)$$

where capital letters denote Fourier transforms of the corresponding lower case functions in the spatial domain, $I_1$ and $I_2$ are the image spectra, H is the optical transfer function (OTF), S is the scene spectrum, and (u, v) are co-ordinates in the spatial frequency domain.

By assuming that the OTF and the scene spectra are non-zero, the ratio of the image spectra can be calculated using $$\frac{I_2(u, v)}{I_1(u, v)} = \frac{H(u, v; z_d, p_2) S(u, v)}{H(u, v; z_d, p_1) S(u, v)} \quad (5)$$
$$= \frac{H(u, v; z_d, p_2)}{H(u, v; z_d, p_1)}$$
$$= H_{21}(u, v; z_d, p_1, p_2)$$

where $H_{21}$ is defined to be the relative OTF.

The spectral ratio $$\frac{I_2}{I_1}$$

of equation (5) is independant of the scene s and is a function of the image defocus distance $z_d$. Hence, by determining the scene spectrum, $I_1$ and $I_2$, of the two captured images, $i_1$ and $i_2$, existing DFD methods are able to obtain a depth estimate. In U.S. Patent Publication No. 2013/0266210 A1 (Morgan-Mar et. al.) entitled "Determining a depth map from images of a scene", noisy spectral responses with a large phase difference between $I_1$ and $I_2$ are first removed, a parabola is then fitted to the remaining sampled frequencies of the spectral ratio $$\frac{I_2}{I_1},$$

and the quadratic coancient or tne fitted parabola is used as a depth score s that measures, or more accurately estimates a measure of, relative depth. An equivalent DFD method is also provided in the spatial domain using the Gabor filter to allow hardware implementation. Hereafter, this description will refer to this Gabor filter-based DFD method of U.S. Patent Publication No. 2013/0266210 A1 as the Gabor DFD method. To convert depth scores s to physical depth values d (which correspond to the subject distances $z_{os}$ 255 of FIG. 2), the camera must be first calibrated for the particular DFD method being used. During calibration, a DFD calibration curve is generated to map DFD depth scores s to physical depth values d. Similarly, the physical depth values d are, more accurately, estimates of (physical) depth values.

To generate a calibration curve, the spectral ratio $$\frac{I_2}{I_1}$$

is computed for a set of spatial frequencies u, v and defocus distances $z_d$ with equation (5) using the lens design and the known camera parameters $p_1$ and $p_2$. Then, the DFD method is applied to compute a depth score for each of the subject distances $z_{os}$ that correspond to the defocus distances $z_d$ used. For instance, in the case where the particular DFD method is the Gabor DFD method, this involves fitting a parabola to the spectral ratio $$\frac{I_2}{I_1}$$

computed for each subject distance $z_{os}$ using a least squares approach. The quadratic coefficient of the fitted parabola is then used as the depth score s for that subject distance $z_{os}$.

Alternatively, for each set of camera parameters $p_1$ and $p_2$, a calibration curve can be obtained by capturing image pairs of a test pattern at different depths and applying the DFD methods to each image pair to obtain a depth score s for the corresponding depth value. For each depth, multiple image pairs are captured and their average DFD depth score is used for calibration. The standard deviation of the depth scores can also be used as a confidence measure of the calibrated depth. Typically, confidence is a maximum at best focus and drops off on either side of the best focus distance.

Instead of capturing image pairs at different depths for calibration, defocus blurs corresponding to different depth d (and, hence, defocus distances $z_d$) and camera parameters $p_1$ and $p_2$, can be digitally applied to a test pattern. Specifically, equation (5) can be rearranged to give $$I_2(u, v) = H_{21}(u, v; z_d, p_1, p_2) I_1(u, v). \quad (6)$$

This corresponds in the spatial domain to $$i_2(x, y) = h_{21}(x, y; z_d, p_1, p_2) \otimes i_1(x, y) \quad (7)$$

where $h_{21}$ is the relative PSF or relative blur. Both the optical transfer function $H_{21}$ and the relative PSF $h_{21}$ can be calculated for different depths using the lens design and a set of camera parameters $p_1$ and $p_2$. Equations (6) and (7) can then be used to produce defocus images digitally in the Fourier and spatial domains respectively for the calibration process.

Figure 4:
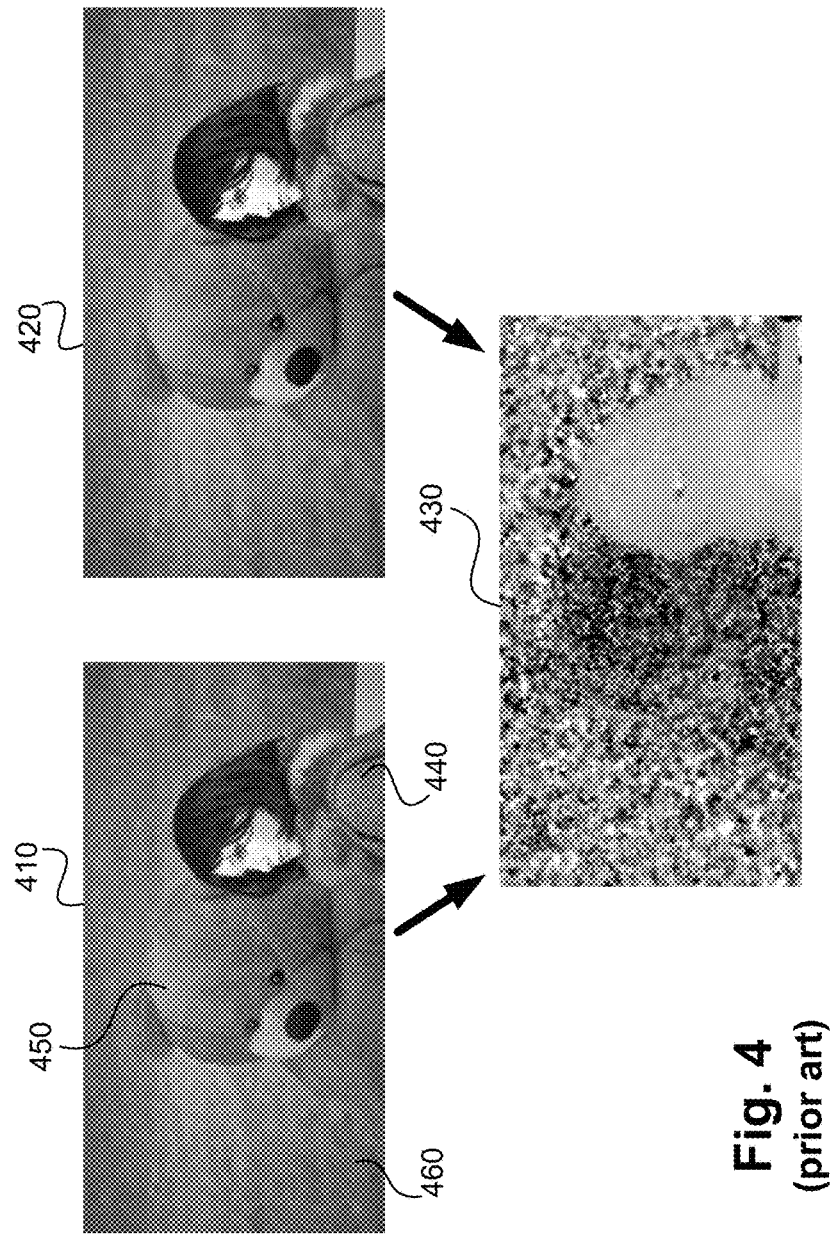
FIG. 4 is an example of another image pair with a small depth-of-field (DoF) and an associated prior art DFD depth map.
Figure 5:
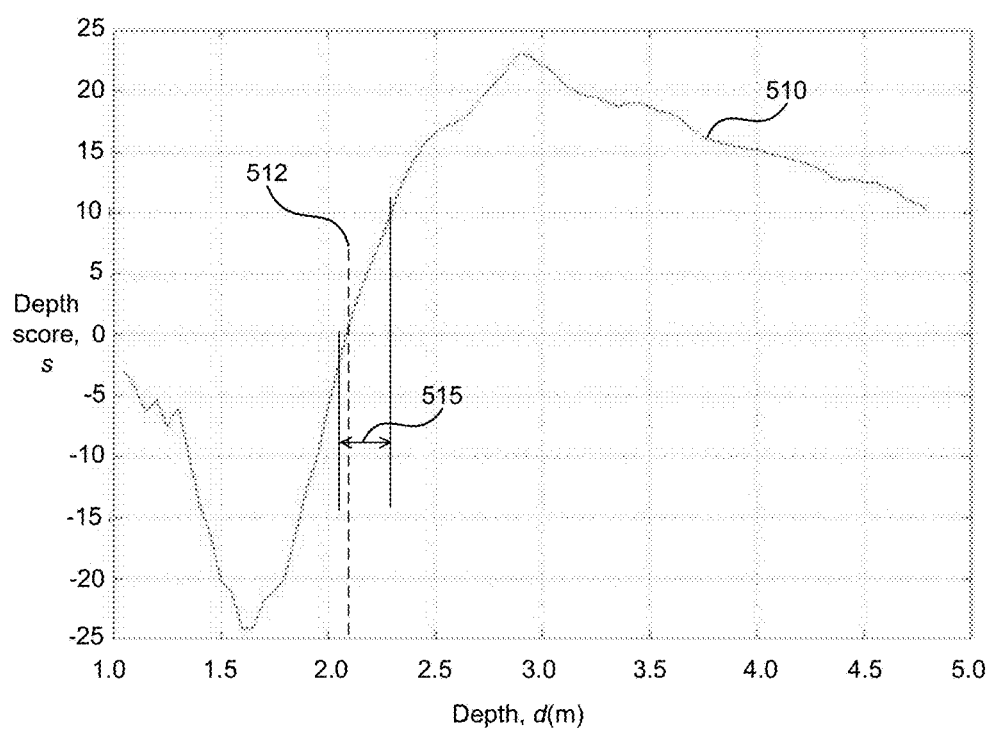
FIG. 5 is a calibration curve for the DFD depth map of FIG. 4.

FIG. 5 shows a calibration curve 510 obtained using defocus blur digitally applied to a test pattern that consists of 256 ×256 pixels of random intensity. The blurred images are computed with equation (7) for a set of depth values d using the same set of camera parameters used for capturing the image pair 410, 420 of FIG. 4 and the OTF model published by Stokseth in the article "Properties of a Defocused Optical System". Journal of the Optical Society of America, October 1969, 59, pp 1314-1321. The Gabor DFD method is used to compute a defocus score $d_r$ for each depth value d to generate the calibration curve. For the images 410 and 420 which have small DoF, the calibration curve 510 is not a monotonic function. The mapping between depth scores s and depth d is only one-to-one around a depth of best focus 512. A region 515 around the depth of best focus 512 of one-to-one mapping between depth scores s and depth d defines a working range R of the calibration curve. At depths closer to or further from the camera than the working range 515, the depth score s maps to multiple depth values and is unusable because of ambiguity. This explains why the depth map 430, has consistent depth scores around the mostly in-focus mannequin 440 but shows inconsistent and conflicting depth scores for the out-of-focus teddy bear 450 and the grassy backdrop 460. It can be shown that the smaller the DoF, the smaller the working range. While the calibration curve 510 is generated specifically for the Gabor DFD method, the characteristics of the curve 510 are shared by the calibration curves of all DFD methods that are based on the spectral ratio $$\frac{I_2}{I_1}.$$

To extend the working range of DFD on small DoF images, the present disclosure proposes to perform DFD on an image pair at multiple spatial resolutions, or multiple (spatial) scales, and to combine the depth estimates, noting that in this description, the terms "scale" and "resolution" are essentially synonymous. Specifically, the preferred implementations construct a Gaussian pyramid for each image of an image pair, perform DFD on the corresponding pair of images at each level of the two image pyramids, convert the DFD depth scores to physical depth values using calibration curves generated for each level, and combine the depth values from all levels in a coarse-to-fine manner to obtain a final depth map that covers the entire depth range of the scene. Accordingly, the arrangements provide multi-scale depth estimation using depth from defocus.

To avoid aliasing, an image has to be filtered to remove high spatial frequency components before down-sampling. The Gaussian pyramid of an image is formed of successively low-pass filtered and down-sampled versions of the image, with the original image, containing all frequencies captured forming the base of the pyramid, and the smallest down-sampled version of the image being arranged at the tip of the pyramid. In a preferred implementation, a 5 ×5 pixel Gaussian filter with a sigma of 1 pixel is used to low-pass filter an image, before the image is down-sampled by a factor of 2 to form a new image for the next level. By performing DFD on corresponding pairs of images from each level of the image pyramid, a depth pyramid containing the DFD depth scores is created. To convert the depth scores to physical depth, a different calibration curve is needed at each level of the pyramid. This is because the maximum spatial frequency which determines the portion of the OTF, H, used for determining the spectral ratio $$\frac{I_2}{I_1},$$

is repeatedly lowered as the image is repeatedly low-pass filtered from the base to the tip of the pyramid.

Figure 6A:
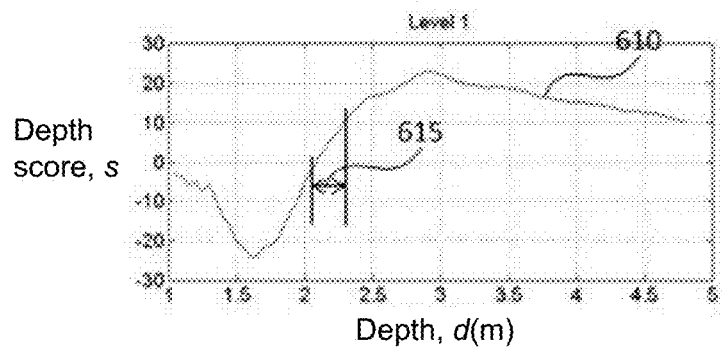
FIGS. 6A to 6F is a set of calibration curves for the DFD depth maps generated from the Gaussian pyramids of the image pair of FIG. 4.
Figure 6B:
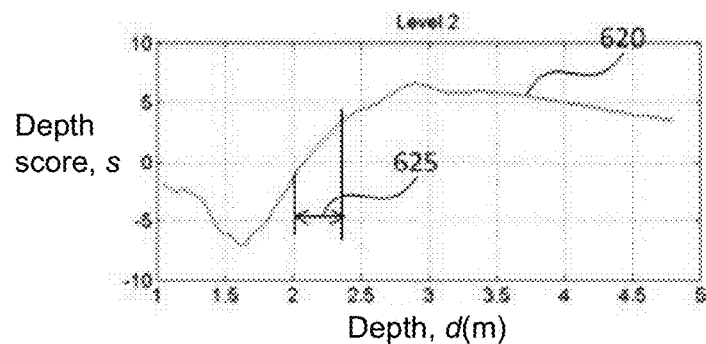
Figure 6C:
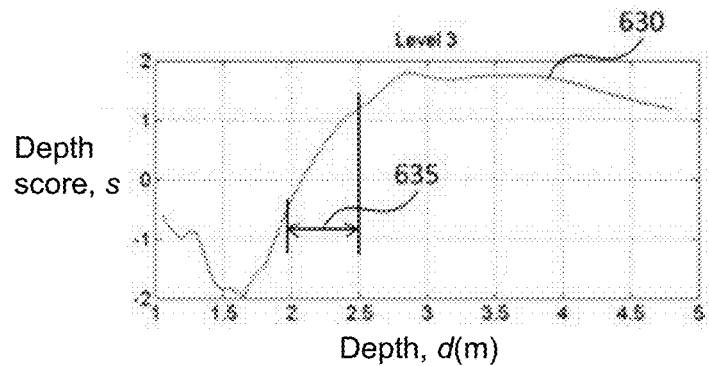
Figure 6D:
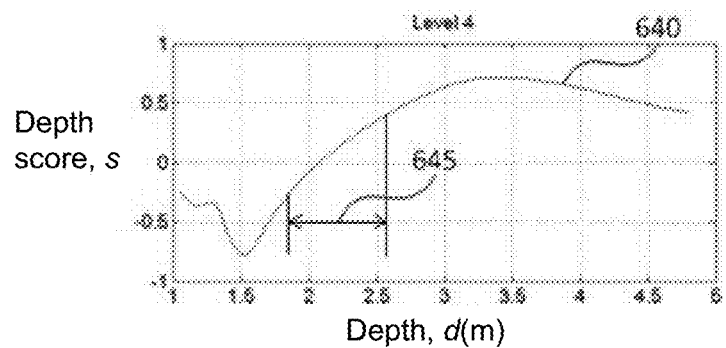
Figure 6E:
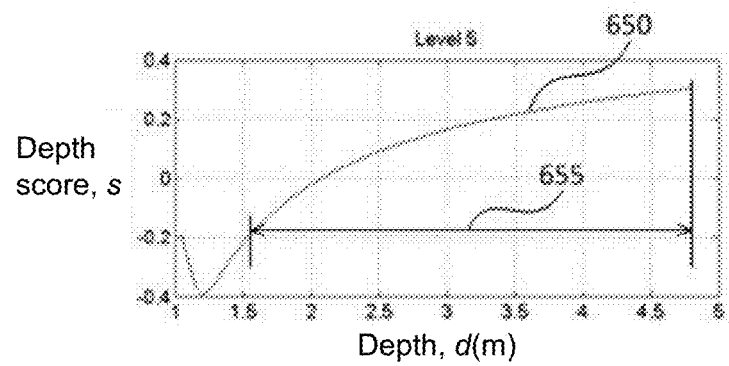
Figure 6F:
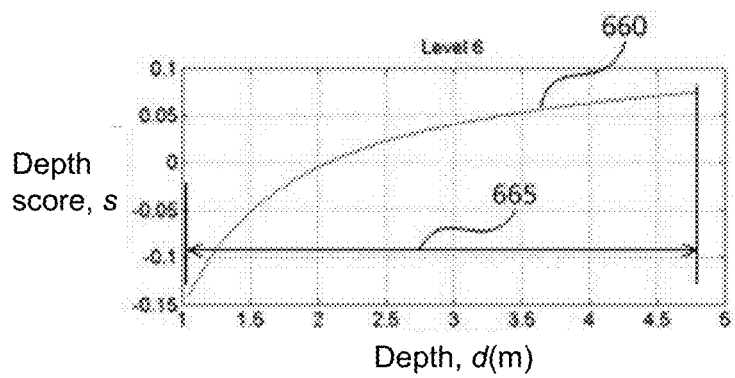

FIG. 6A to 6F shows calibration curves 610, 620, 630, 640, 650, 660 respectively for a 6-level depth pyramid produced by applying the Gabor DFD method to the Gaussian pyramid of the image pair 410 and 420 of FIG. 4. Specifically, the curves of FIGS. 6A to 6F relate depth score s, being a relative depth measurement, with physically depth. The calibration curve 610 for the 1$^{st}$ level (that is, the base) of the depth pyramid is the same calibration curve 510 of FIG. 5. As the level increases towards the tip (or top) of the depth pyramid, the calibration curve flattens out and eventually becomes a monotonic function at level 6 of the pyramid. As a result, the corresponding working ranges 615, 625, 635, 645, 655, 665 of the calibration curves increase with the level of the pyramid until the working range eventually covers the entire depth range required for the scene (FIG. 6F). The increase in the working range with the level of the pyramid is accompanied by a reduction in depth sensitivity over the working range. Hence, while it is possible to derive a depth map from a single level of the pyramid that covers the required depth range of the scene, the accuracy of the resulting depth map will suffer due to the lower depth sensitivity at that level. For this reason, a preferred implementation utilises the depth estimates from all levels of the pyramid combining depth estimates that fall within the working range of the calibration curves of their respective level.

Preferably, the calibration curves of FIGS. 6A to 6F are stored in the camera 127 with each being associated with a corresponding downsampled image resolution, where Level 1 (FIG. 6A) relates to the original resolution of image capture and Level 6 (FIG. 6F) represents a calibration curve for a fifth downsampling.

Figure 7:
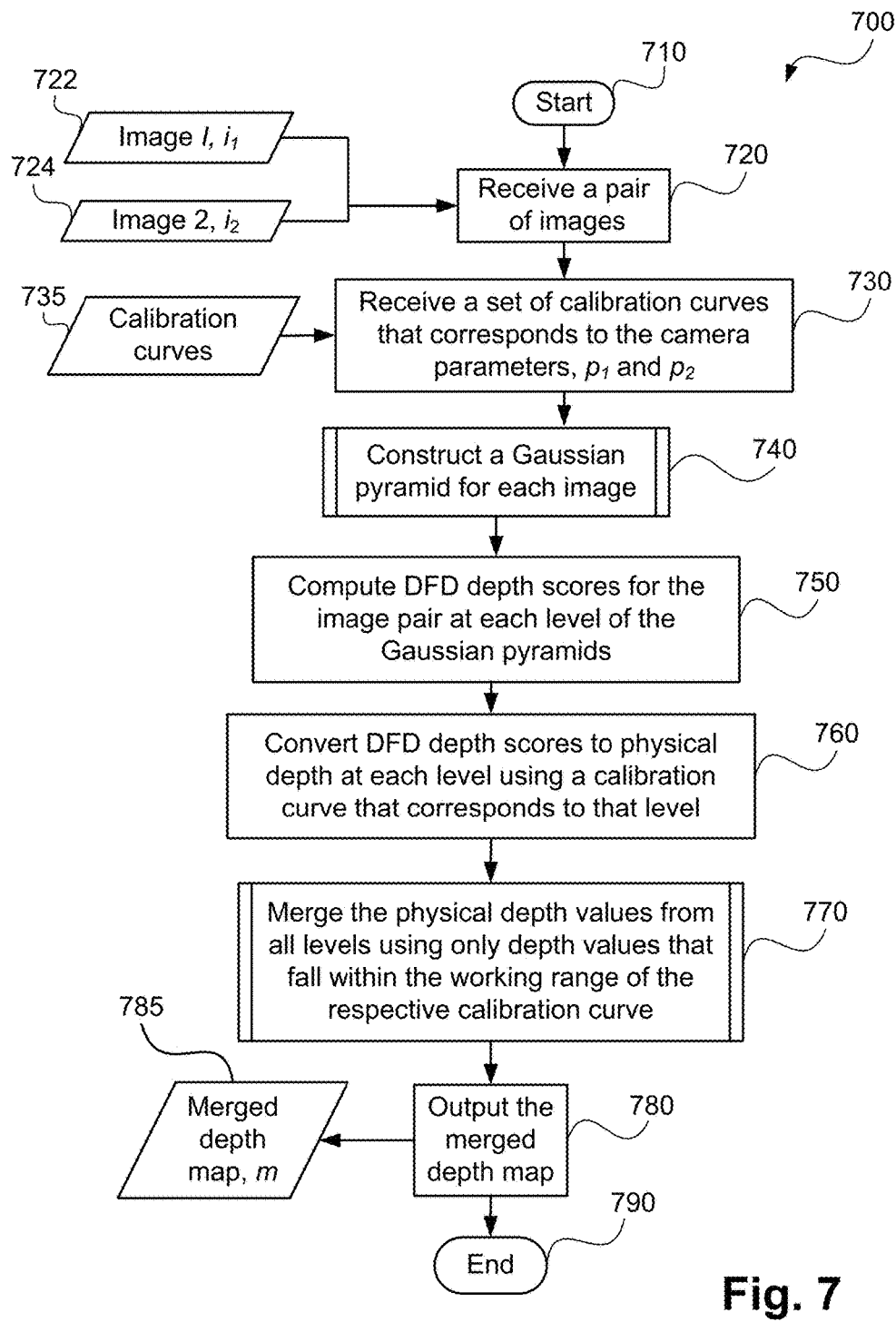
FIG. 7 is a schematic flow diagram illustrating a method of determining a depth map for a pair of images with a small DoF according to one aspect of the present disclosure.

FIG. 7 is a flow chart showing a method 700 for determining a depth map m corresponding to a pair of images $i_1$, $i_2$ of a scene, and is particularly useful where both images have a small DoF. The approaches presently described may nevertheless be used with pairs of images both having a large depth of field. The method 700 may be implemented as one or more software code modules of the software application program 133 resident on the hard disk drive 110 and being controlled in its execution by the processor 105.

The method 700 begins at receiving step 720, where a pair of images $i_1$ 722 and $i_2$ 724 is received as input. At a next receiving step 730, a set of calibration curves 735 that correspond to the camera parameters $p_1$ and $p_2$ used for capture of the images $i_1$ 722 and $i_2$ 724 respectively, is received as input. Then at the constructing step 740, a Gaussian pyramid is constructed for each of the images Both Gaussian pyramids will each have the same number of levels, with the original images 722 and 724 forming the base of the pyramids. The number of levels may be pre-defined and depend on the size of the images Alternately, the number of levels may be determined dynamically using a method 800 which will be described in detail with reference to FIGS. 8A and 8B.

Figure 13:
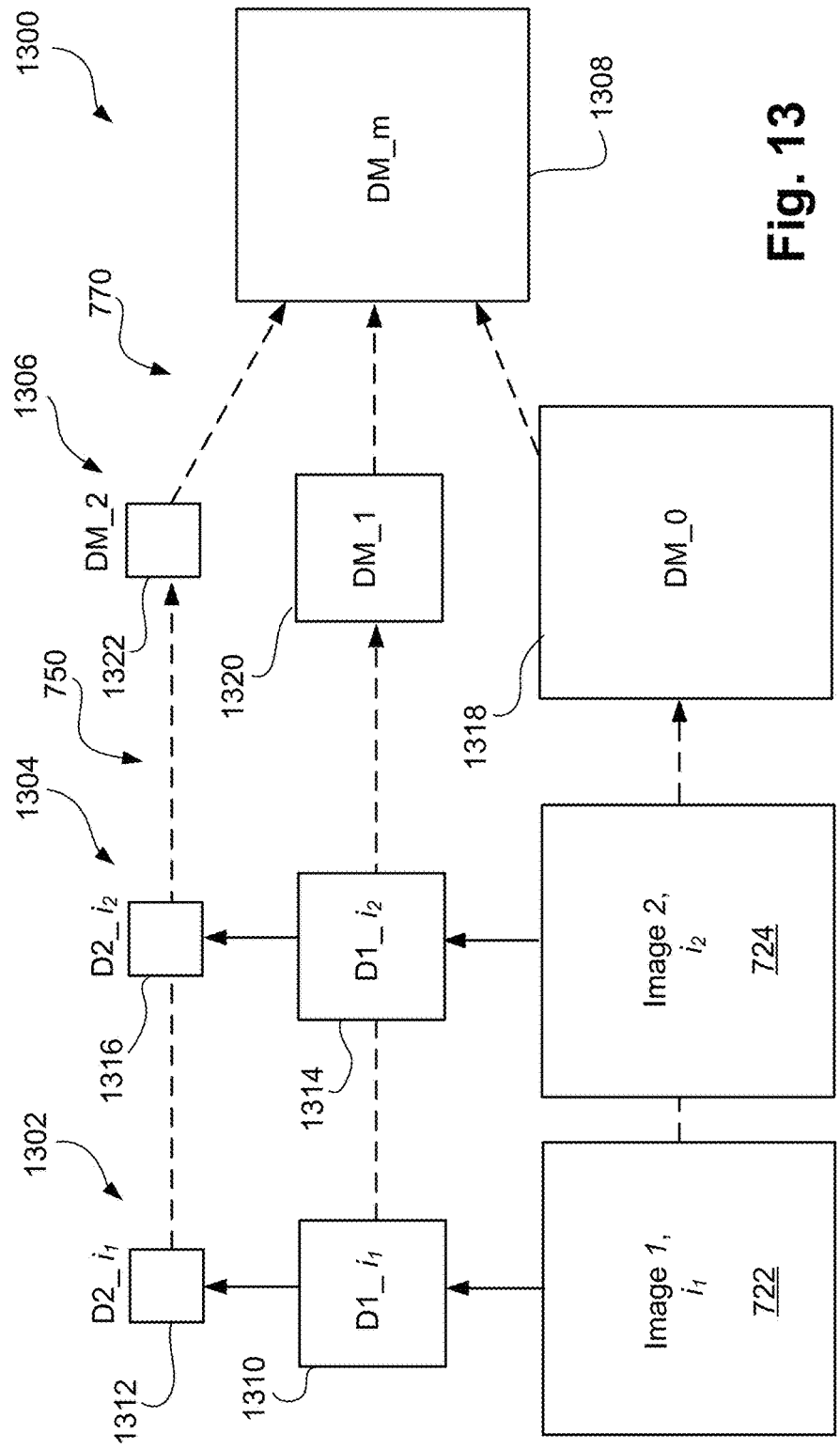
FIG. 13 schematically illustrates the forming of the pyramids and corresponding depth maps and their merging.

An example of the Gaussian pyramids is seen in FIG. 13 which provides a schematic illustration 1300 of the major aspects of the method 700. Specifically, each of the input images 722 and 724 spawn a corresponding Gaussian pyramid 1302 and 1304. In this example, the pyramids 1302 and 1304 have 3 levels, thereby each including the original captured image, and a plurality of spatial (downsampled) resolutions 1310 and 1312, 1314 and 1316 respectively, with the corresponding downsampled spatial resolutions being generically labelled D1 and D2 in FIG. 13. Like the input images, each downsampled level has a corresponding pair of images, 1310 and 1314, 1312 and 1316. At least one downsampling from the original input resolution is required for the presently disclosed arrangements, thereby forming a Gaussian pyramid with a minimum of two levels.

The method 700 continues at a computing step 750, where DFD depth scores are computed for the image pair at each level of the Gaussian pyramid of the image pair $i_1$ 722 and $i_2$ 724. This is also seen in FIG. 13 where each resolution level of the pyramids is used to form a corresponding depth map of physical depth values, in this case DM_0 1318, DM_1 1320, and DM_2 1322 respectively, which form collectively form a depth map pyramid 1306. Not illustrated in FIG. 13 (for clarity) is an additional pyramid of relative depth scores produced by the computing step 750 and which is converted by step 760 into the depth map pyramid 1306, which holds the physical depth values. For some DFD methods including the Gabor DFD method, a corresponding confidence score c in the range [0, 1] is computed for each depth score, effectively creating a map of DFD depth scores and an associated confidence map that are the same size as the image pair.

At a converting step 760, the DFD depth scores at each level are converted to physical depth values using a calibration curve that corresponds to the maximum spatial frequency of that level. The result is a depth pyramid of physical depth values with the same number of levels of Gaussian pyramid of the images. At a merging step 770, the physical depth values from all levels of the depth pyramid are merged to form a merged depth map m. This is also illustrated in FIG. 13 where each level of the depth map pyramid 1306 is merged to form a merged depth map (DM_m) 1308. Only depth values that fall within the working range of their respective calibration curve are used in the merge while those that fall outside are excluded. Two alternate methods, 900 and 1000, of merging the physical depth values of the depth pyramid, may be executed to implement step 770, and will be described in detail with reference to FIG. 9 and FIG. 10 respectively. At the completion of the merging step 770, the merged depth map 785 is output at step 780 and method 700 terminates.

Figure 8A:
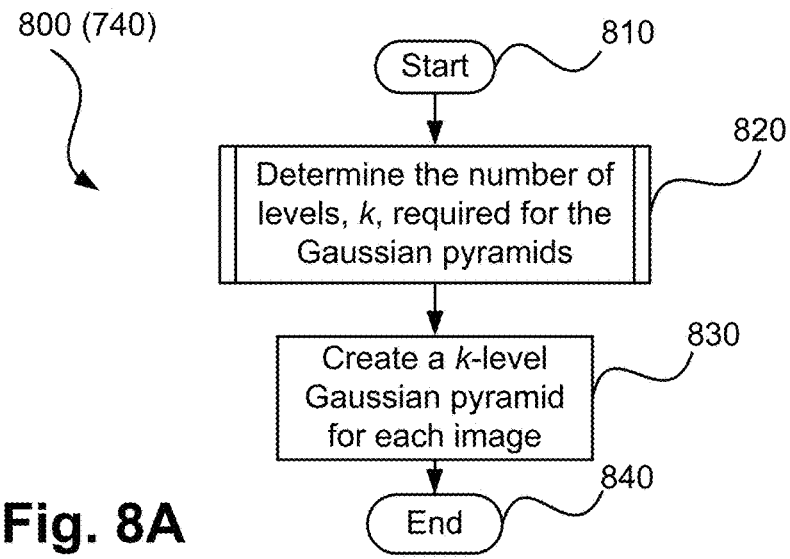
FIGS. 8A and 8B collectively form a schematic flow diagram illustrating a method of determining the number of levels required for the Gaussian pyramid of a pair of images in order to generate a DFD depth map that covers the entire depth range of a scene according to another aspect of the present disclosure.
Figure 8B:
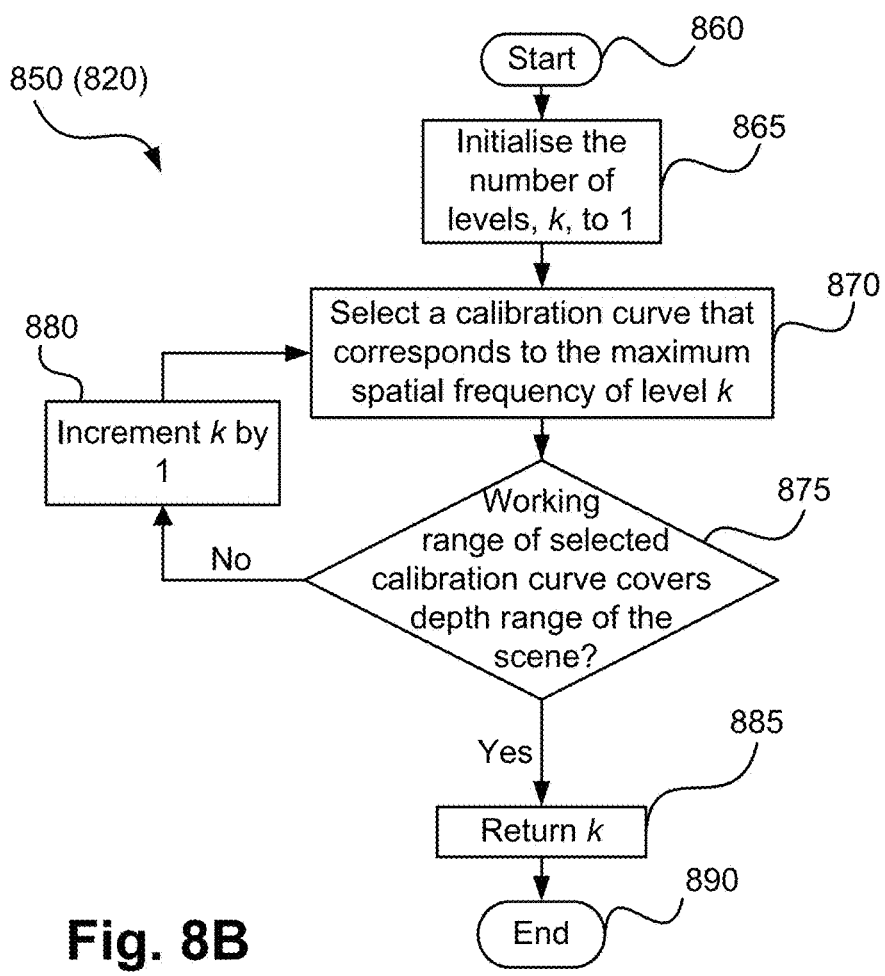

A method 800 of dynamically constructing Gaussian pyramids with sufficient number of levels for covering the depth range of a scene, which may be executed at step 740, will now be described in detail with reference to FIGS. 8A and 8B. As seen in FIG. 8A, the method 800 begins at determining step 820, where the number of levels, k, required for the Gaussian pyramids, is determined. Then, at step 830, a k-level Gaussian pyramid is created for each image as described above before method 800 terminates. A method 850, as executed at step 820, determines the number of levels required for the Gaussian pyramids, and is shown in FIG. 8B. The method 850 begins at setting step 865, where the number of levels, k, is initialised to 1. Then, at selecting step 870, a calibration curve that corresponds to the maximum spatial frequency of level k is selected from the set of calibration curves 735 received by method 700. At checking step 875, the working range $R_k$ of the selected calibration curve is compared with the depth range of the scene. If the working range does not cover the depth range of the scene, the number of levels, k, is incremented by 1 in step 880 before selecting step 870 is repeated. If the working range covers the depth range of the scene, the value k is returned as the required number of levels in step 885 and method 850 terminates. The depth range of the scene may be pre-defined to go from zero depth to infinite to ensure the Gaussian pyramids will always have enough levels to cover the largest depth range possible. Alternatively, a set of smaller depth ranges can be pre-defined for various camera settings so that Gaussian pyramids with a smaller number of levels will be used to reduce computation. Once the depth range of the scene is specified, the working range thereby establishes the number of levels in the pyramids.

Figure 9:
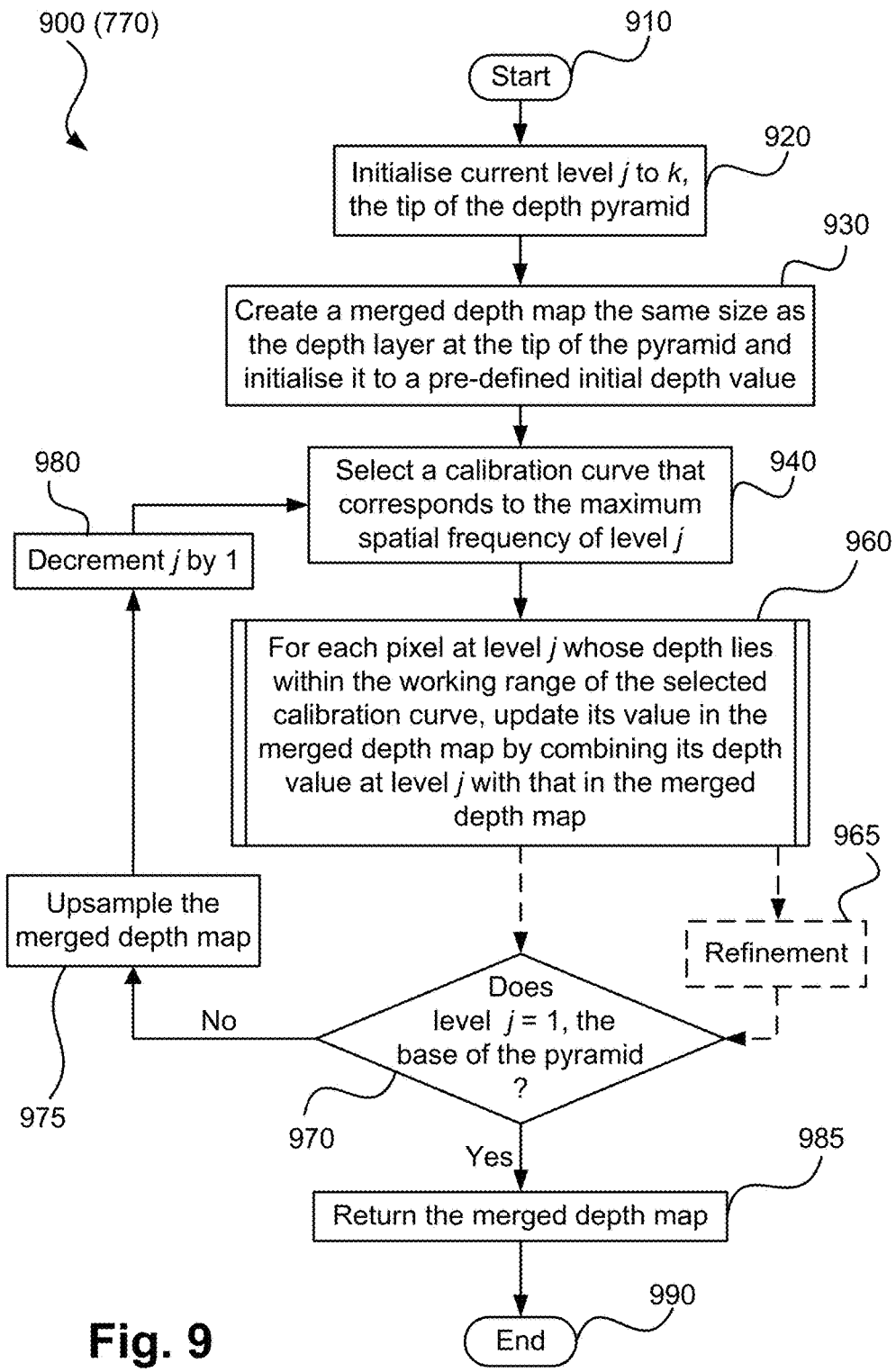
FIG. 9 is a schematic flow diagram illustrating a method of extending the working range of DFD by merging the depth estimates from all levels of a DFD depth pyramid according to another aspect of the present disclosure.

A method 900 of merging depths from all levels of a depth pyramid to form a depth map with higher depth resolution and accuracy, which may be executed at step 770, will now be described in detail with reference to FIG. 9. The method 900 begins at initialising step 920, where a variable, j, used for representing a current level of the depth pyramid, is initialised to k, the number of levels of the depth pyramid. With this established, the method 900 starts at the tip of the depth pyramid (e.g. 1306). Then at creating step 930, a merged depth map the same size as the depth layer at the tip of the pyramid is created and is initialised to a pre-defined value. In one implementation, the pre-defined value for the initial merged depth map is the maximum depth of the scene. If the DFD method being used computes a confidence score for each depth score, a confidence score will be defined and associated with each pixel of the merged depth map. The initial confidence scores will be set to 0.

The method 900 continues at step 940 where the processor 105 selects a calibration curve that corresponds to the maximum spatial frequency of level j from the set of calibration curves 735 received by method 700. Then, at merging step 960, for each pixel at level j whose depth lies within the working range $R_j$ of the selected calibration curve, the depth value for the pixel in the merged depth map is updated by combining the depth value at level j of the depth pyramid with the current depth value in the merged depth map. In one implementation, the depth value of a pixel in the merged depth map is simply overwritten with the corresponding depth value at level j of the depth pyramid, since depth resolution and accuracy over the respective working ranges increases as one moves from the tip to the base of the depth pyramid. This approach can be expressed according to Equation (8), $$m(x, y) = \begin{cases} d_j(x, y) & \text{if } d_j(x, y) \in R_j \\ m(x, y) & \text{otherwise} \end{cases} \quad (8)$$

where m(x, y) is the depth value of a pixel at the location (x, y) of the merged depth map and $d_j$(x, y) is the depth value of the same pixel at level j of the depth pyramid and $R_j$ is the working range of the calibration curve for level j.

In an alternative implementation, where each depth value is associated with a confidence score, the depth value of a pixel in the merged depth map is replaced by a weighted sum of the depth value of the pixel at level j of the depth pyramid and the current depth value of the pixel in the merged depth map using the confidence scores as weights. Specifically, the depth values in the merged depth map are updated with equation (9) as follows:

$$m(x, y) = \begin{cases} \dfrac{c_j(x, y)d_j(x, y) + \beta c_m(x, y)m(x, y)}{c_j(x, y) + \beta c_m(x, y)} & \text{if } d_j(x, y) \in R_j \\ m(x, y) & \text{otherwise} \end{cases} \quad (9)$$

where $d_j$(x, y) and $c_j$ (x, y) are the depth value and the associated confidence score of a pixel at location (x, y) at level j of the depth pyramid, m(x, y) and $c_m$(x, y) are the depth value and the associated confidence score of the same pixel in the merged depth map, and β is a pre-defined parameter in the range [0,1] used for reducing the contribution of the coarser levels of the pyramid to the merged depth value due to their lower depth resolution and accuracy.

The confidence score $c_m$ (x, y) is then updated by equation (10) as follows:

$$c_m(x, y) = \begin{cases} \dfrac{[c_j(x, y)]^2 + \beta[c_m(x, y)]^2}{c_j(x, y) + \beta c_m(x, y)} & \text{if } d_j(x, y) \in R_j \\ c_m(x, y) & \text{otherwise} \end{cases} \quad (10)$$

A β value of 0.75 has been found to give good performance over a large number of images.

The method 900 continues at checking step 970, where the current level j is checked against 1. If j≠ 1, the base of the pyramid has not been reached and the method 900 proceeds to step 975. At step 975, the merged depth map m, together with any associated confidence map $c_m$, is up-sampled to the size of the depth map at the next finer level of the depth pyramid (i.e. the next level down the pyramid). The current level variable j is then decremented by 1 at step 980 to point to the next finer level of the depth pyramid before returning to the selecting step 940. If the current level j is found to be 1 at checking step 970, the base of the pyramid has been reached. The merged depth map is returned at step 985, and method 900 terminates.

Figure 11A:
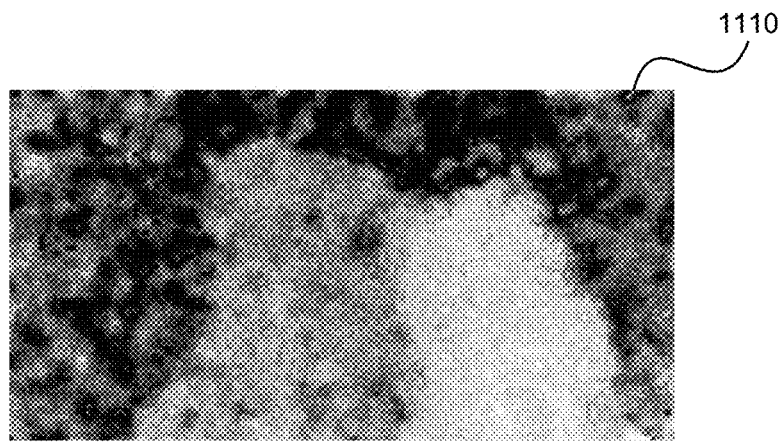
FIGS. 11A and 11B are example merged depth maps produced by the methods 700 and 900 respectively.

Depth map 1110 of FIG. 11A shows a merged depth map produced by method 900 and equation (8), given the input DFD depth scores 430 of the image pair 410 and 420 of FIG. 4. Compared with the input depth map 430, the depth range of the merged depth map 1110 have been greatly extended, and the relative depth of the mannequin, the teddy bear and the grassy backdrop can be clearly identified.

Figure 11B:
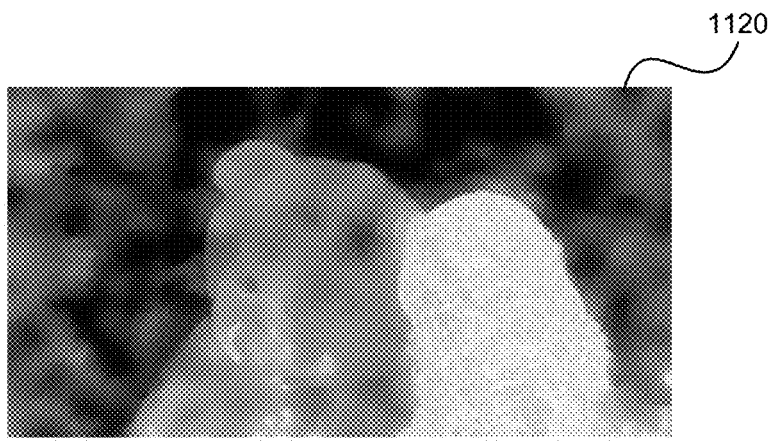

The merging of DFD depth estimates from multiple spatial resolutions can be combined with the refinement of the depth estimates to reduce noise in depth estimates and to align depth boundaries with object edges. The method 900 of FIG. 9 can be slightly modified by including an additional refining step 965 between merging step 960 and checking step 970. The refining step 965 operates to refine the merged depth map produced by step 960 before the level of the depth pyramid, j, is checked in step 970. That is, the refinement process operates upon a depth map that has merged depth estimates of all spatial resolutions up to the spatial resolution of the current level of the pyramid, j. In one implementation, a joint bilateral filter, or joint bilateral filtering (JBF) is used for refining each depth layer of the depth pyramid. Using the corresponding down-sampled image in the Gaussian pyramid as a prior, the joint bilateral filter smooths out the depth values while preserving discontinuities in the data that coincide with the edges in the image. Depth map 1120 of FIG. 11B shows a merged and refined depth map produced by such an extension using JBF, given the input DFD depth scores 430 of the image pair 410 and 420 of FIG. 4. Like the merged depth map 1110 of FIG. 11A, the depth range of the refined merged depth map 1120 have been greatly extended. At the same time, compared with the merged depth map 1110, depth errors have been greatly reduced, and the depth and object boundaries are much more accurately aligned in the depth map 1120.

In an alternative implementation, a refined merged depth map is computed from the DFD depth estimates at each level of the depth pyramid by minimising an energy function $$E(m) = \sum_{p \in \mathcal{P}} \left[ D(m_p; d_p, c_p) + \alpha \sum_{q \in \mathcal{N}_p} V(m_p, m_q) \right] \quad (11)$$

where $m_p$ is the unknown depth values of a pixel p in the merged depth map m, $d_p$ and $c_p$ are the DFD depth estimate and its associated confidence score of pixel p respectively, $\mathcal{P}$ is the set of pixels at that level of the depth pyramid, $\mathcal{N}_p$ is the 4-connected neighbourhood of pixel p, D(•) is a data cost term that penalises discrepancies between $m_p$ and $d_p$, V (•) is a smoothness cost term that penalises large changes in depth between adjacent pixels, and a is a smoothness parameter that controls the relative contribution of the smoothness cost to the overall cost E. The refinement process operates by minimising an energy function that penalises depth values that:

(i) deviate from the DFD depth scores of the current spatial scale, where such a data penalty increases with the associated confidence measure of the depth estimates, and/or (ii) produce large local depth gradients, with such a penalty reduced at pixels where a large local depth gradient is matched by a large local intensity or colour gradient in the associated image. Where desired, the "non-smoothness" penalty may be reduced to zero at those pixels.

In one specific example, the data cost can be defined to be:

$$D(m_p; d_p, c_p) = c_p |m_p - d_p|^2 \qquad (12)$$

The smoothness cost can be similarly defined to be:

$$V(m_p, m_q) = |m_p - m_q|^2 \qquad (13)$$

To enable the optimisation to locate a good local minimum and locate that minimum efficiently, after completing each level of the depth pyramid, the merged depth map is up-sampled and is used to initialise the merged depth map at the next finer level. This alternative method of merging and refining depths from all levels of a depth pyramids to form a depth map with higher depth resolution and accuracy, which may be executed at step 770, will now be described in detail with reference to FIG. 10.

Figure 10:
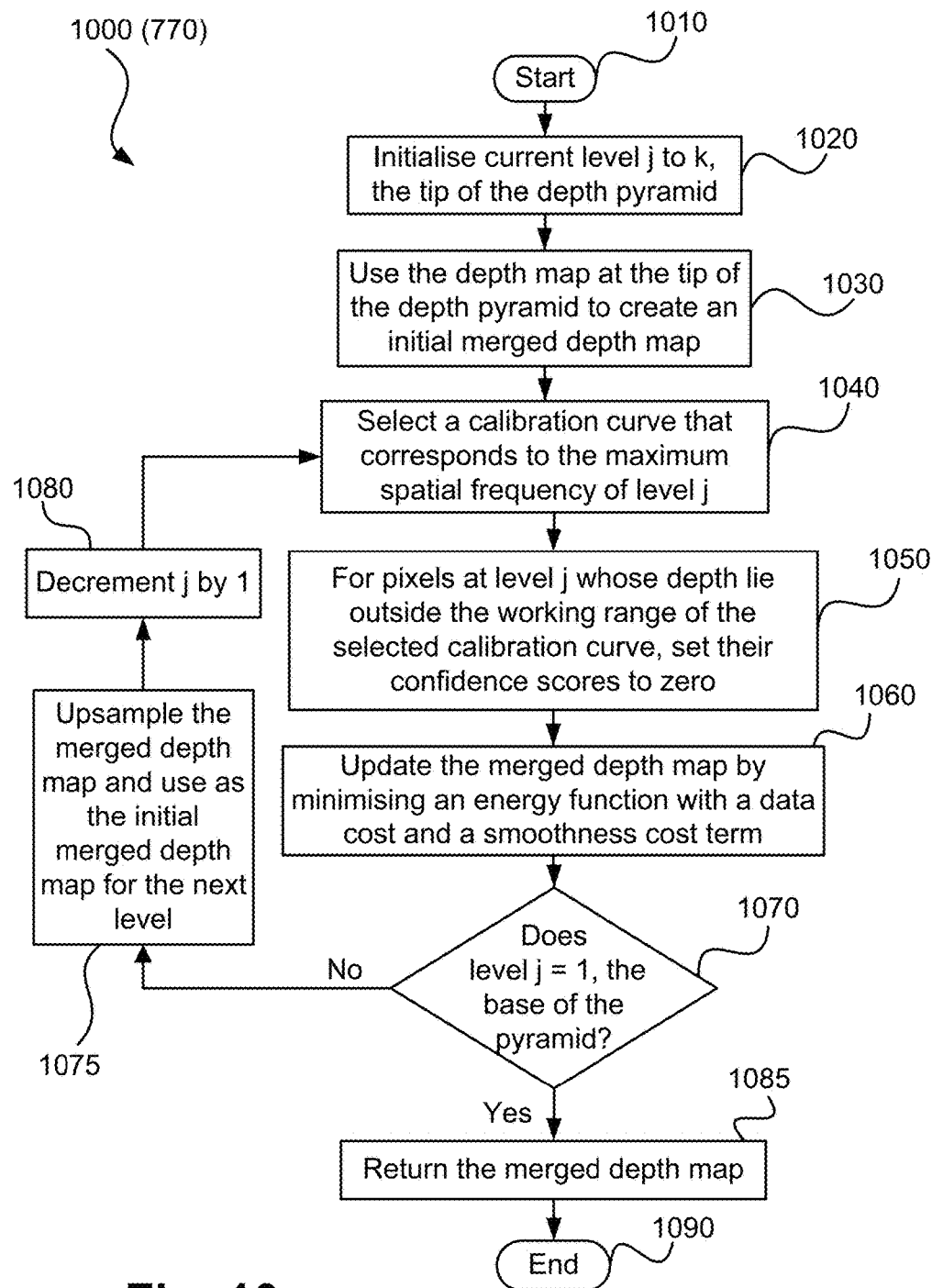
FIG. 10 is a schematic flow diagram illustrating a method of extending the working range of DFD by merging and refining the depth estimates from all levels of a DFD depth pyramid according to a further aspect of the present disclosure.

The method 1000 of FIG. 10 begins at initialising step 1020, where a variable, j, used for representing a current level of the depth pyramid, is initialised to k, the number of levels of the depth pyramid. Again, the method 1000 will start with the top of the depth pyramid. Then at creating step 1030, an initial merged depth map is created using the depth map at the tip of the pyramid. At step 1040, a calibration curve that corresponds to the maximum spatial frequency of level j is selected from the set of calibration curves 735 received by method 700. Then, at step 1050, the confidence scores of all pixels at level j whose depth lie outside the working range $R_j$ of the selected calibration curve are set to zero. In updating step 1060, the depth values in the merged depth map are updated by minimising the energy function of equation (11).

The method 1000 continues at checking step 1070, where the current level j is checked against 1. If j≠ 1, the base of the pyramid has not been reached. At step 1075, the merged depth map m, is upsampled to the size of the depth map at the next finer (higher resolution) level of the depth pyramid and is used as the initial merged depth map for the next level. The current level variable j is then decremented by 1 at step 1080 to point to the next finer level of the depth pyramid before selecting step 1040 is repeated. If the current level j is found to be 1 at checking step 1070, the base of the pyramid has been reached. The merged depth map is returned at step 1085, and method 1000 terminates.

The depth boundaries of the refined merged depth map from method 1000 can be further improved by modification with JBF and variants thereof. JBF is computationally intensive and applying JBF, especially one with large filter kernels, to a large depth map is time consuming Instead of applying JBF to an entire depth map, the present inventor has determined that it is possible to restrict the edge-preserved filtering to potential depth boundaries only. The refined merged depth map of method 1000 is then relatively smooth. Potential depth boundaries can be located by looking for edges in an associated image that coincide with a large sudden change in depth values in the depth map.

Figure 12:
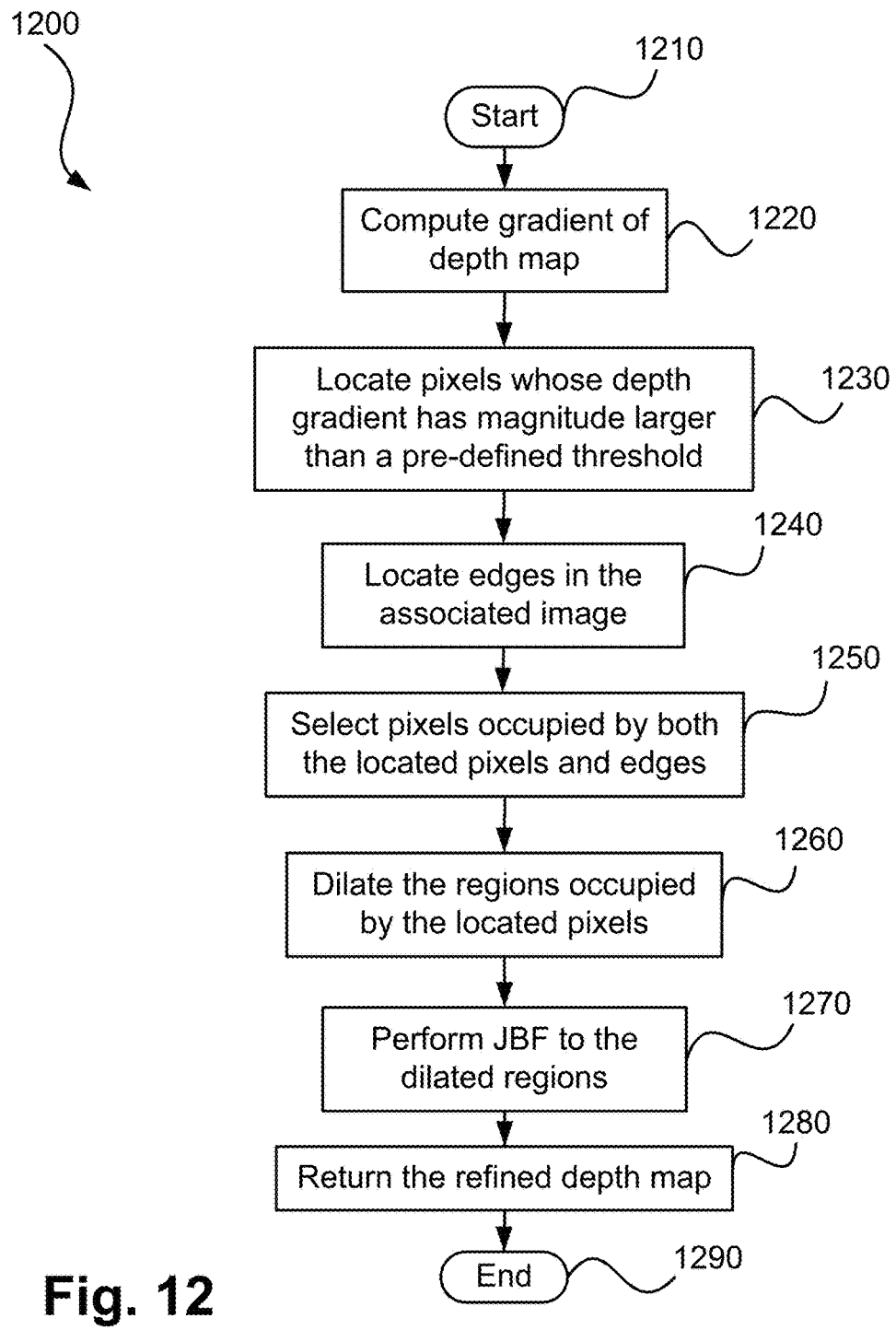
FIG. 12 is a schematic flow diagram illustrating a method of refining the potential depth boundary of a depth map according to a further aspect of the present disclosure.

A method 1200 of refining a merged depth map by aligning depth boundaries with object edges, which may be executed following method 1000, will now be described in detail with reference to FIG. 12. The method 1200 of FIG. 12 begins at initialising step 1220, where the magnitude of the gradient of the depth map, $\|\nabla m\|$, is computed by the processor 105. In one implementation, first-order difference is used for approximating the gradient and the magnitude of the depth gradient at location (x, y) is given by $$\|\nabla m(x, y)\| = \sqrt[2]{(m(x+1, y) - m(x, y))^2 + (m(x, y+1) - m(x, y))^2} \qquad (14)$$

Steps 1230 and 1240 then operate to locate pixels that are potentially lying on a depth boundaryAt a first locating step 1230, pixels whose depth gradient has a magnitude that is larger than a pre-defined threshold are located. In one example, the threshold is set to 1.5 times the standard deviation of the gradient values above the mean gradient value. At a second locating step 1240, edges in an image associated with the depth map are located. In one implementation, the well-known Canny edge detection algorithm is used. There are two possibilities for locating pixels in steps 1230 and 1240:

(i) identify pixels (in the depth map) whose depth gradient exceeds a pre-defined threshold;

(ii) identify pixels whose depth gradient exceeds a pre-defined threshold and, at the same time, lie on an edge on an associated image. Option (ii) will reduce the number and the size of the regions that needed to be processed by JBF and thus reduce computation cost.

Then, at selecting step 1250, pixels occupied by both the located pixels and located edges are selected. At dilating step 1260, the regions occupied by the selected pixels are dilated by applying morphological dilation to the selected pixels using a pre-defined structuring element. In one specific implementation, a circular structuring element with a radius of 5 pixels is used. Then, at step 1270, JBF is performed on the dilated regions to refine the potential depth boundaries (i.e. the physical depth values) in those regions. The refined depth map is returned at step 1280, and method 1200 terminates.

INDUSTRIAL APPLICABILITY

The arrangements described are applicable to the computer and data processing industries, and particularly for the determination of depth in images and improved depth measurement. More accurate image segmentation is one application of improved depth measures. The disclosed arrangements are particularly applicable to images having a small depth of field, but nevertheless can be used where images have a wide depth of field.

The foregoing describes only some embodiments of the present invention, and modifications and/or changes can be made thereto without departing from the scope and spirit of the invention, the embodiments being illustrative and not restrictive.

The invention claimed is:

1. A method of generating a merged physical depth map from a pair of images of a scene captured by an image capture device using different capture parameters, said method comprising:

generating, from the captured pair of images, at least one pair of downsampled images at a corresponding spatial resolution; and for each pair of images:

forming a relative depth map from the pair of images;

accessing calibration data of the image capture device associated with the pair of images, the calibration data relating relative depth measurements with physical depth and having a defined working range where a single relative depth measurement relates to a single physical depth; and determining a physical depth map for the pair of the images from the formed relative depth map and the accessed calibration data; and generating a merged physical depth map by merging, in order of increasing spatial resolution, depth values based on the defined working range associated with each of the determined physical depth maps.

2. A method according to claim 1, wherein generating the merged physical depth map uses confidence measures associated with the relative depth estimates to weight the physical depth values from corresponding spatial resolutions when merging the physical depth values.

3. A method according to claim 1, wherein the generating the merged physical depth map refines the physical depth map at each spatial resolution by:
   upsampling a depth map of the previous coarser resolution and using the upsampled depth map as an initial refined depth map;
   forming a current refined depth map by minimising an energy function that penalises depth values that, at least one of:
      (i) deviate from the physical depth measurements of the current spatial resolution; and
      (ii) produce large local depth gradients.

4. A method according to claim 3 wherein for (i), the energy function operates such that a data penalty increases with the associated confidence measure of the depth measurements.

5. A method according to claim 3 wherein the penalty of (ii) is reduced at pixels where a large local depth gradient is matched by a large local intensity gradient in the associated image.

6. A method according to claim 3, further comprising modifying depth boundaries of the refined depth map by:
   (i) locating pixels that are potentially lying on a depth boundary;
   (ii) dilating regions of said located pixels; and
   (iii) performing edge-preserved filtering on said dilated regions of said located pixels to modify the corresponding physical depth values and thereby the corresponding depth boundary.

7. A method according to claim 6, wherein the edge-preserved filtering comprises joint bilateral filtering.

8. A method according to claim 6 wherein step (i) comprises locating pixels with an associated image and whose depth gradient exceeds a pre-defined threshold to thereby define a depth boundary.

9. A method according to claim 6 wherein step (i) comprises identifying pixels whose depth gradient exceeds a pre-defined threshold and lie on an edge on the associated image.

10. A non-transitory computer readable storage medium having a program recorded thereon, the program being executable by a processor to generate merged physical depth map from a pair of images of a scene captured by an image capture device using different capture parameters, said program comprising:
   code for generating, from the captured pair of images, at least one pair of downsampled images at a corresponding spatial resolution; and
   code, operative for each pair of images, to:
      form a relative depth map from the pair of images;
      access calibration data of the image capture device associated with the pair of images, the calibration data relating relative depth measurements with physical depth and having a defined working range where a single relative depth measurement relates to a single physical depth; and
      determine a physical depth map for the pair of the images from the formed relative depth map and the accessed calibration data; and
   code for generating a merged physical depth map by merging, in order of increasing spatial resolution, depth values based on the defined working range associated with each of the determined physical depth maps.

11. A non-transitory computer readable storage medium according to claim 10, wherein the code for generating the merged physical depth map uses confidence measures associated with the relative depth estimates to weight the physical depth values from corresponding spatial resolutions when merging the physical depth values.

12. A non-transitory computer readable storage medium according to claim 10, wherein the code for generating the merged physical depth map refines the physical depth map at each spatial resolution by:
   upsampling a depth map of the previous coarser resolution and using the upsampled depth map as an initial refined depth map;
   forming a current refined depth map by minimising an energy function that penalises depth values that, at least one of:
      (i) deviate from the physical depth measurements of the current spatial resolution ; and
      (ii) produce large local depth gradients.

13. A non-transitory computer readable storage medium according to claim 12 wherein for (i), the energy function operates such that a data penalty increases with the associated confidence measure of the depth measurements, and the penalty of (ii) is reduced at pixels where a large local depth gradient is matched by a large local intensity gradient in the associated image.

14. A non-transitory computer readable storage medium according to claim 11, further comprising code for modifying depth boundaries of the refined depth map by:
   (i) locating pixels that are potentially lying on a depth boundary;
   (ii) dilating regions of said located pixels; and
   (iii) performing edge-preseved filtering on said dilated regions of said located pixels to modify the corresponding physical depth values and thereby the corresponding depth boundary.

15. A non-transitory computer readable storage medium according to claim 14 wherein step (i) comprises locating pixels with an associated image and whose depth gradient exceeds a pre-defined threshold to thereby define a depth boundary, and the edge-preserved filtering comprises joint bilateral filtering.

16. A non-transitory computer readable storage medium according to claim 14 wherein step (i) comprises identifying pixels whose depth gradient exceeds a pre-defined threshold and lie on an edge on the associated image, and the edge-preserved filtering comprises joint bilateral filtering.

17. Apparatus comprising a processor and a memory, the memory storing a program executable by the processor for generating a merged physical depth map from a pair of images of a scene captured by an image capture device using different capture parameters, the program comprising:
   code for generating, from the captured pair of images, at least one pair of downsampled images at a corresponding spatial resolution; and
   code, operative for each pair of images, to:
      form a relative depth map from the pair of images;
      access calibration data of the image capture device associated with the pair of images, the calibration data relating relative depth measurements with physical depth and having a defined working range where a single relative depth measurement relates to a single physical depth; and determine a physical depth map for the pair of the images from the formed relative depth map and the accessed calibration data; and code for generating a merged physical depth map by merging, in order of increasing spatial resolution, depth values based on the defined working range associated with each of the determined physical depth maps.

18. Apparatus according to claim 17, wherein code for generating the merged physical depth map uses confidence measures associated with the relative depth estimates to weight the physical depth values from corresponding spatial resolutions when merging the physical depth values.

19. Apparatus according to claim 17, wherein the code for generating the merged physical depth map refines the physical depth map at each spatial resolution by:
   upsampling a depth map of the previous coarser resolution and using the upsampled depth map as an initial refined depth map;
   forming a current refined depth map by minimising an energy function that penalises depth values that, at least one of:
   (i) deviate from the physical depth measurements of the current spatial resolution; and
   (ii) produce large local depth gradients.

20. A camera comprising:
   an image capture arrangement including a lens and an image sensor via which objects in a scene can be imaged;
   a processor; and
   a memory storing a program executable by the processor for generating a merged physical depth map from a pair of images of the scene captured by the image capture arrangement using different capture parameters, the program comprising:
   code for generating, from the captured pair of images, at least one pair of downsampled images at a corresponding spatial resolution; and
   code, operative for each pair of images, to:
      form a relative depth map from the pair of images;
      access calibration data of the image capture device associated with the pair of images, the calibration data relating relative depth measurements with physical depth and having a defined working range where a single relative depth measurement relates to a single physical depth; and
      determine a physical depth map for the pair of the images from the formed relative depth map and the accessed calibration data; and
   code for generating a merged physical depth map by merging, in order of increasing spatial resolution, depth values based on within the defined working range associated with each of the determined physical depth maps.

21. A method according to claim 2, wherein a confidence measure associated with a relative depth estimate is determined using a working range for a corresponding calibration data.

22. A non-transitory computer readable storage medium according to claim 11, wherein a confidence measure associated with a relative depth estimate is determined using a working range for a corresponding calibration data.

23. Apparatus according to claim 18, wherein a confidence measure associated with a relative depth estimate is determined using a working range for a corresponding calibration data.

* * * * *